(12) United States Patent
Kahle et al.

(10) Patent No.: US 6,371,163 B1
(45) Date of Patent: Apr. 16, 2002

(54) MIXING VALVE

(75) Inventors: Dieter Kahle, Hemer; Eberhard Stolle, Hagen, both of (DE)

(73) Assignee: Friedrich Grohe AG & Co. KG, Hemer (DE)

( * ) Notice: Subject to any disclaimer, the term of this patent is extended or adjusted under 35 U.S.C. 154(b) by 0 days.

(21) Appl. No.: 09/713,798

(22) Filed: Nov. 15, 2000

(30) Foreign Application Priority Data

Nov. 24, 1999 (DE) .......................................... 199 56 401

(51) Int. Cl.[7] .............................................. F16K 11/06
(52) U.S. Cl. ................. 137/625.4; 137/625.17
(58) Field of Search ........................... 137/359, 625.17, 137/625.4, 625.41

(56) References Cited

U.S. PATENT DOCUMENTS

| | | | | |
|---|---|---|---|---|
| 5,167,255 A | * | 12/1992 | Gohring et al. | 137/607 |
| 5,660,203 A | * | 8/1997 | Gnauert et al. | 137/359 |
| 5,730,176 A | * | 3/1998 | Heimann et al. | 137/359 |
| 6,058,972 A | | 5/2000 | Kahle | |

* cited by examiner

Primary Examiner—John Fox
(74) Attorney, Agent, or Firm—Herbert Dubno; Andrew Wilford

(57) ABSTRACT

A valve assembly has a one-piece housing having lower, upper, and side sockets respectively defining lower, upper, and side openings. A stepped mounting sleeve has a downwardly directed shoulder bearing inwardly on an upper-opening shoulder, an upwardly directed shoulder, and a threaded lower end engage in a holder inside the housing. An insert mounted on the holder has a front face directed outward at the side opening, adapted to carry a valve cartridge, and provided with connections for fluid supply lines. A mounting rod extending through the insert and sleeve has an upper end at the upper socket and a lower portion extending out of the housing through the lower opening. A nut threaded on the upper rod end bears downward on the upwardly directed shoulder of the mounting sleeve. Mounting structure engaged with the rod lower portion outside the housing secures the housing down against a mounting surface.

11 Claims, 7 Drawing Sheets

MIXING VALVE

FIELD OF THE INVENTION

The present invention relates to a mixing valve. More particularly this invention concerns a housing assembly for a mixing valve or the like.

BACKGROUND OF THE INVENTION

As described in commonly owned U.S. Pat. No. 6,058,972 a valve body has a hollow rigid housing formed with at least two outwardly open sockets centered on respective axes that extend generally perpendicularly of each other and a connector body fitted in one of the sockets at an intersection of the axes and having an outer face directed outwardly in the one socket and an inner face directed outward in the other socket. The connector body is also formed with a plurality of passages extending between the faces. A valve cartridge is secured to the connector-body outer face. In addition an insert body fitted in the other socket has an inner face engaging complementarily with the connector-body inner face and is formed with passages having inner ends opening into the connector-body passages at the connector-body inner face and outer ends. One of the inner faces is formed as a recess and the other as a complementary projection such that when fitted together the connector body is fixed in the housing. Input lines are connected to the outer ends of the insert-body passages and a mounting element extends into the insert body for securing the bodies and housing to a plate.

The one socket extends across the axis of the other socket and in fact the other socket extends across the one socket and is outwardly open in two axially opposite directions. Thus when the two bodies are fitted together they not only secure each other in place, but secure themselves relative to the housing, eliminating the need for any further connection between the housing and the bodies. The mounting element extends through the housing and through both of the bodies and is provided with a nut bearing on the housing in one direction and another nut threaded on the mounting element and bearing in an opposite direction on the plate. This mounting element is a pipe and the body includes a flexible feed tube extending through the pipe. The feed tube can be connected at one end through the insert body to the mixed-water passage of the connector body and can carry at its opposite end a head that serves both as the end of a spout and as a movable sprayer.

While this structure is extremely attractive, with virtually nothing of the mounting hardware visible, it is relatively complex and expensive to manufacture.

OBJECTS OF THE INVENTION

It is therefore an object of the present invention to provide an improved housing assembly for a mixing valve.

Another object is the provision of such an improved housing assembly for a mixing valve which overcomes the above-given disadvantages, that is which is of relatively simple and inexpensive construction.

SUMMARY OF THE INVENTION

A valve assembly has according to the invention a one piece housing having lower, upper, and side sockets respectively defining lower, upper, and side openings. A stepped mounting sleeve has a downwardly directed shoulder bearing inwardly on an upper-opening shoulder, an upwardly directed shoulder, and a threaded lower end engage in a holder inside the housing. An insert mounted on the holder has a front face directed outward at the side opening, adapted to carry a valve cartridge, and provided with connections for fluid supply lines. A mounting rod extending through the insert and sleeve has an upper end at the upper socket and a lower portion extending out of the housing through the lower opening. A nut threaded on the upper rod end bears downward on the upwardly directed shoulder of the mounting sleeve. Mounting structure engaged with the rod lower portion outside the housing secures the housing down against a mounting surface.

The insert can therefore be a simple flat plate serving mainly as a sort of manifold that connects the valve cartridge to the incoming hot- and cold-water lines and the outgoing mixed-water line. Thus the housing need only be machined around its openings; otherwise it can be a simple cast or hydroformed piece.

According to the invention the holder has a collar through which the rod passes and which bears upward on the housing. In addition it has a front face on which the insert is mounted and a pair of arms forming the holder front face. Screws engaged through the insert and threaded into the holder arms press the insert against the holder front face.

The holder can be unitarily formed with a vent housing holding a backflow preventing vent. The insert is formed with hot-, cold-, and mixed-water ports opening at the front face. Respective conduits forming the fluid-supply lines are connected to the insert and communicate with the ports. The insert is formed with respective holes communicating with the ports and receiving the respective conduits. A passage formed in the insert connects the mixed-water port with the vent housing. The insert is provided around the passage connecting the mixed-water port with the vent housing with an O-ring.

The valve assembly wherein the insert and holder are made of metal, normally brass which is corrosion resistant and easily machined.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
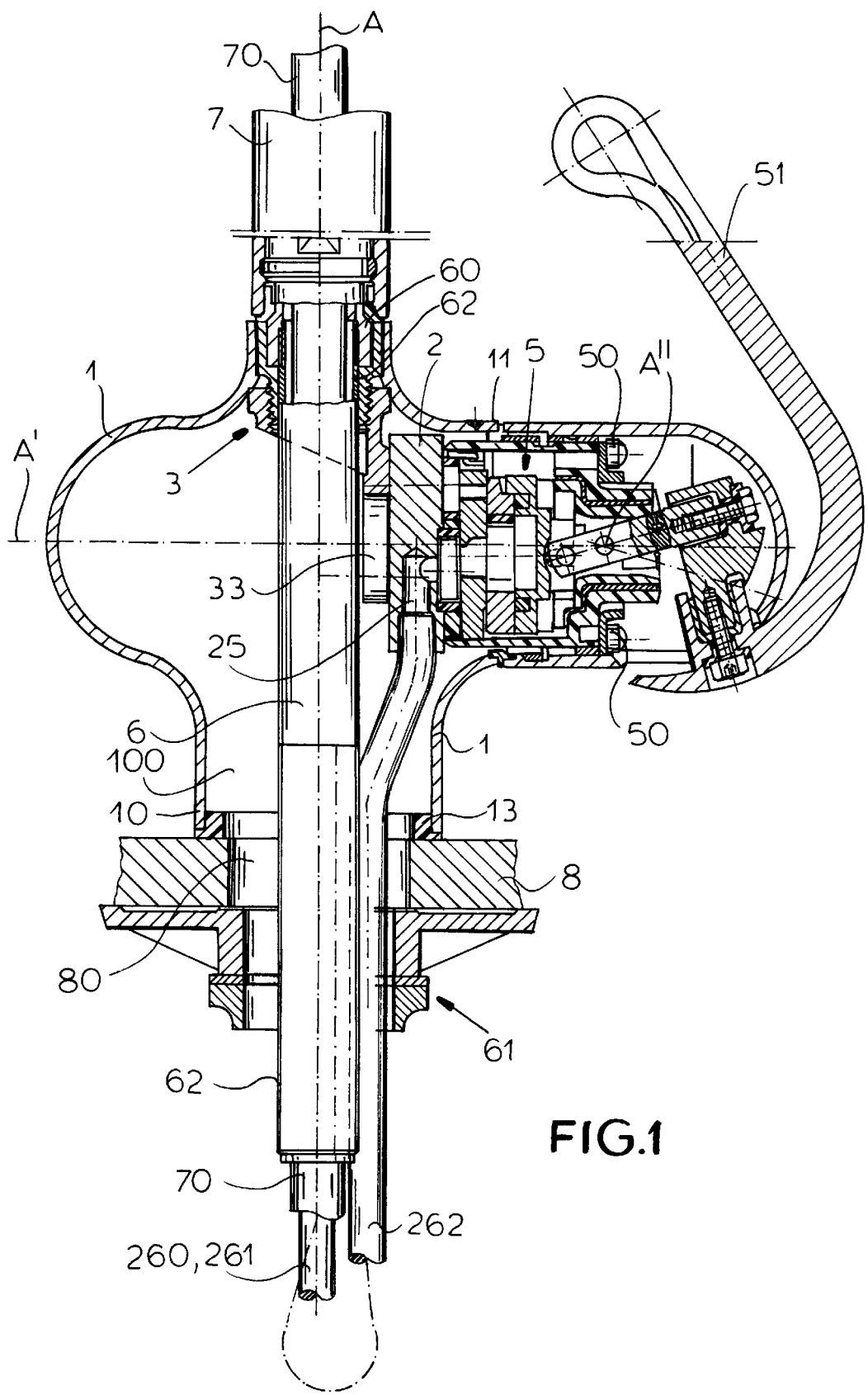
FIG. 1 is an axial section through a mixing valve according to the invention.
Figure 2:
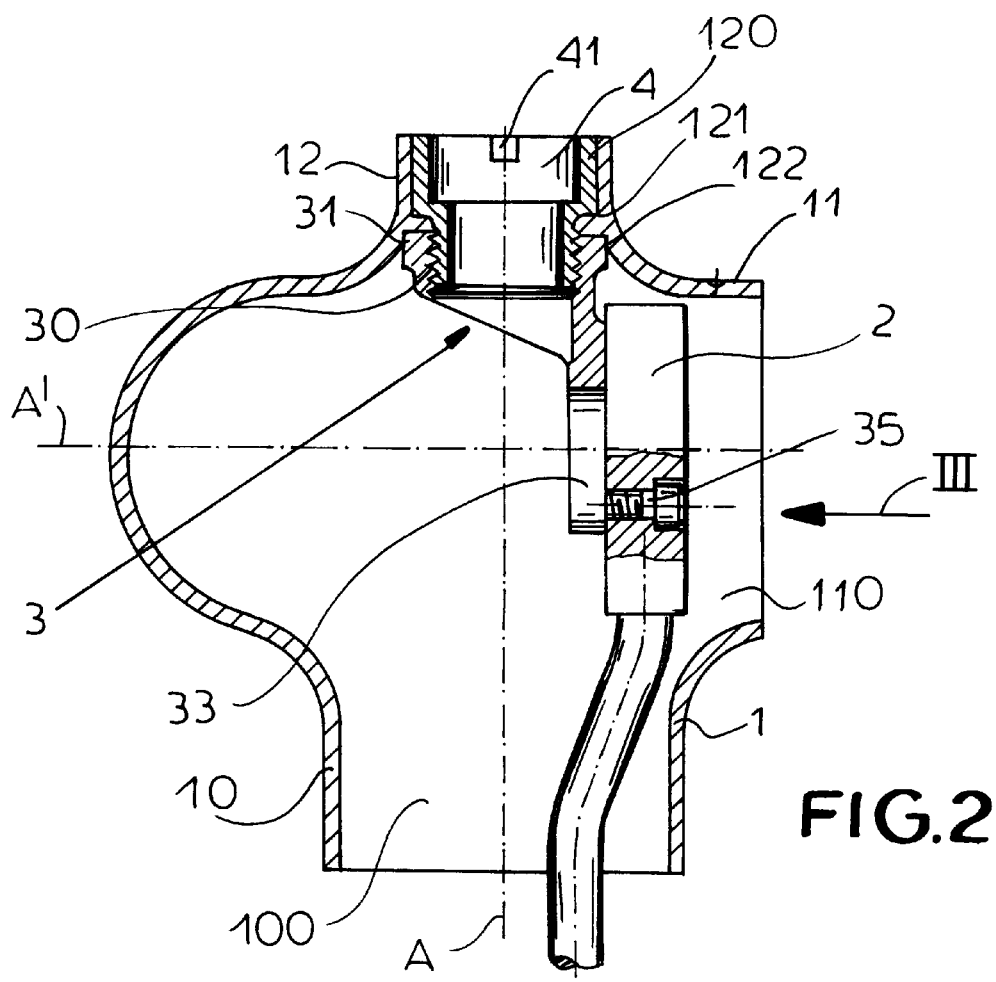
FIG. 2 is an axial section through the housing subassembly of the valve.

As seen in FIGS. 1 and 2 a hydroformed stainless-steel hollow housing 1 is formed with three outwardly open cylindrical collars or sockets 10, 11, and 12 forming respective openings 100, 110, and 120. The lower and upper openings 100 and 120 are centered on a common normally vertical axis A and the side opening 110 is centered on an axis A' that is perpendicular to and intersects the axis A so that it opens horizontally. A brass insert 2 is secured in the housing 1 by a brass holder 3 itself secured in place in the opening 120 by a brass mounting sleeve 4. A standard disk-type valve cartridge 5 is fixed to an outer face of the insert 2 and projects out of the housing 1 at the opening 110.

Figure 3:
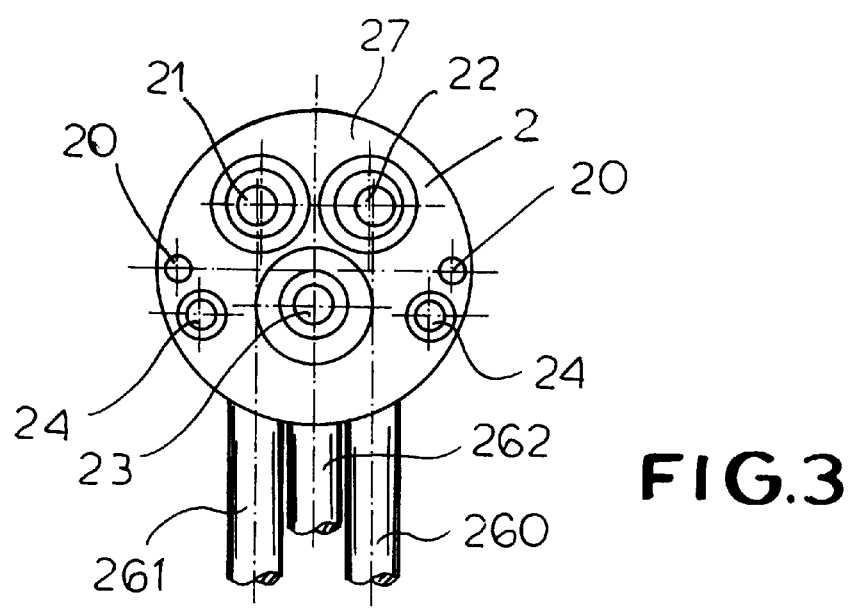
FIG. 3 is a view of the insert taken in the direction of arrow III of FIG. 1 of the insert;.
Figure 4:
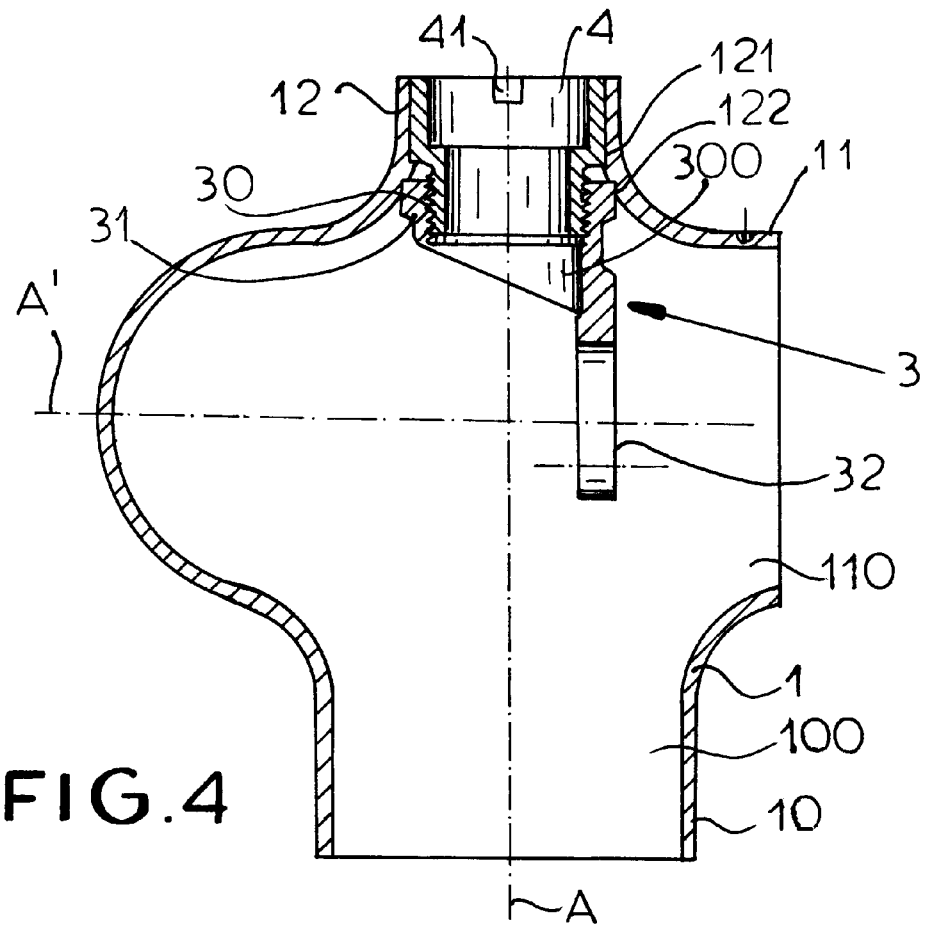
FIG. 4 is a view like FIG. 2 but with the insert removed.

The insert 2 as better shown in FIG. 3 has an outer face 27 at which open two diametrally opposite threaded bores 20 in which are seated screws 50 (shown 90° offset in FIG. 1 for clarity of view) that extend parallel to the axis A' and hold the cartridge 5 in place. Ports 21, 22, and 23 opening on this outer face 27 are connected to downwardly directed passages 25 (one shown in FIG. 1) in which are soldered or brazed the upper ends of copper tubes 260, 261, and 262 connected to hot- and cold-water feeds and to a hose 70 that loops and then passes along the axis A back up through the assembly to a pullout-head spout whose lower end is shown at 7. A lever 51 carried on the cartridge 5 can be pivoted about the axis A' to vary the mix of hot and cold water fed from the lines 260 and 261 to the line 262, and about an axis A'' perpendicular to the axis A' and to the plane of the, axes A and A' to vary the volume of flow from the lines 260 and 261 to the mixed-water output line 262. This single-lever operation is substantially standard.

Figures 5, 6:
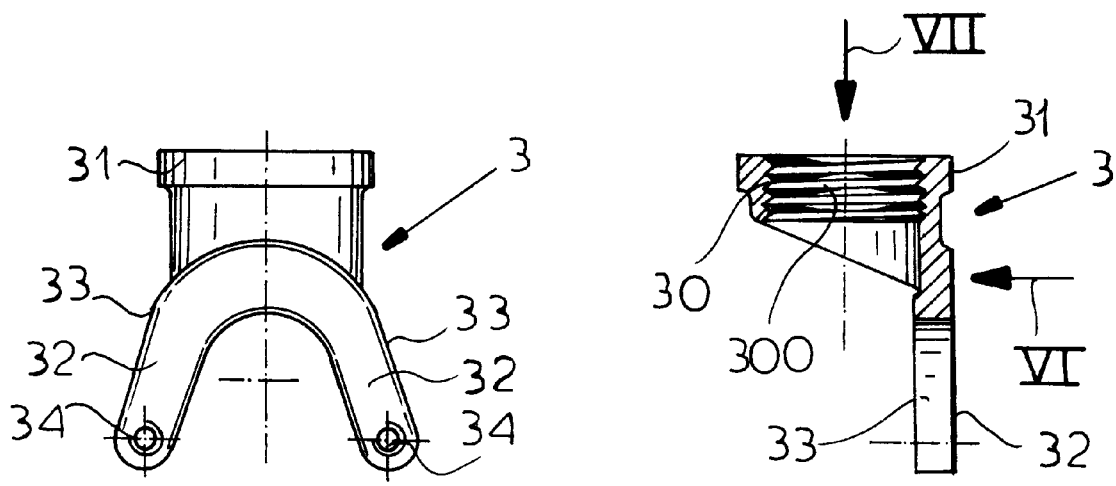
FIG. 5 is a sectional detail view of the insert holder.
FIGS. 6 and 7 are views taken in the direction of arrows VI and VII of FIG. 5.
Figure 7:
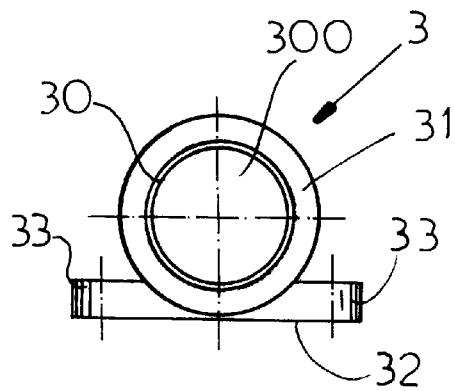

The holder 3 which is shown in some detail in FIGS. 5 through 7 has a collar 31 formed with a central hole 30 having an internal screwthread 300, and with a C-shaped part forming two arms 33 defining a planar front face 32 against which engages a back face of the insert 2. Screws 35 (FIG. 2 only) countersunk in holes 24 (FIG. 3) of the insert 2 are seated in threaded holes 34 at the ends of the arms 34 to solidly fix the insert 2 against the face 32 of the insert 3.

Figure 8:
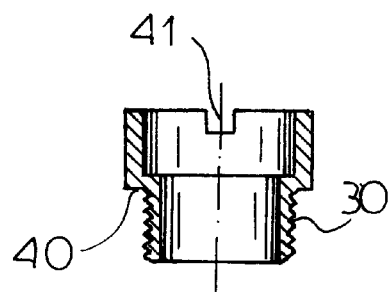
FIG. 8 is a sectional detail view of the mounting sleeve of the subassembly.
Figure 10:
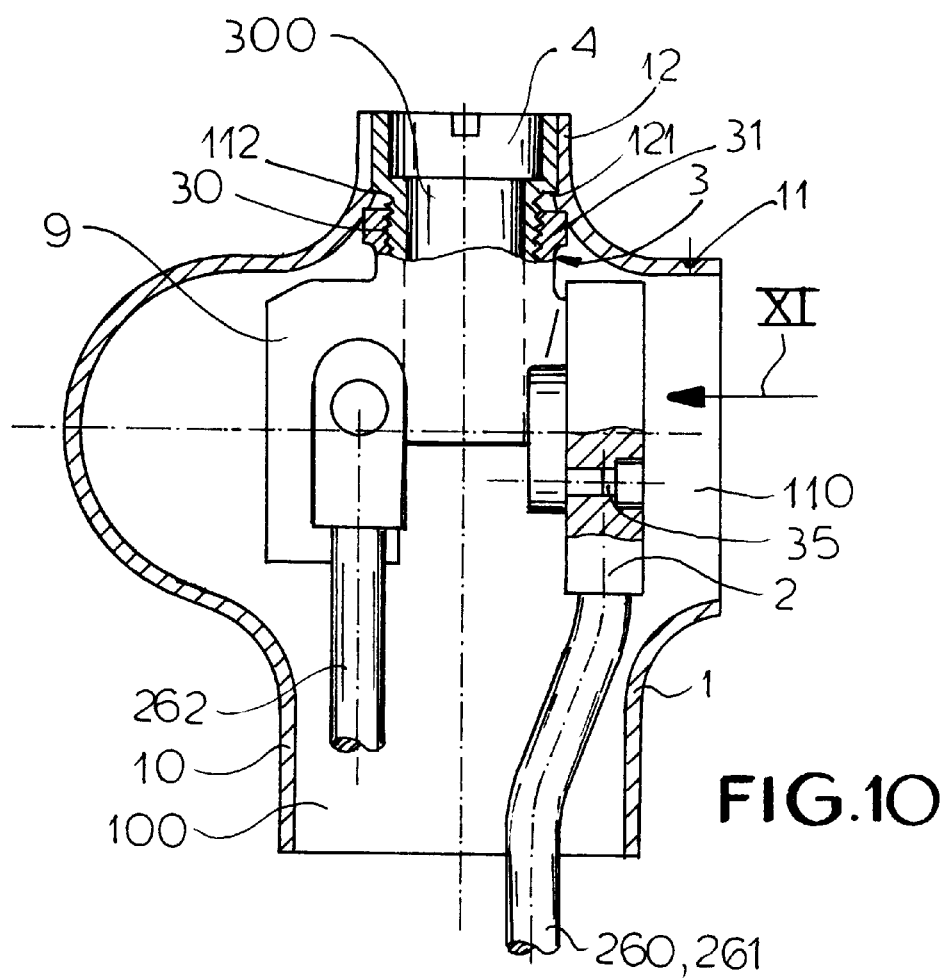
FIGS. 9 and 10 are views comparable to FIGS. 1 and 2 of another valve in accordance with the invention.
Figure 9:
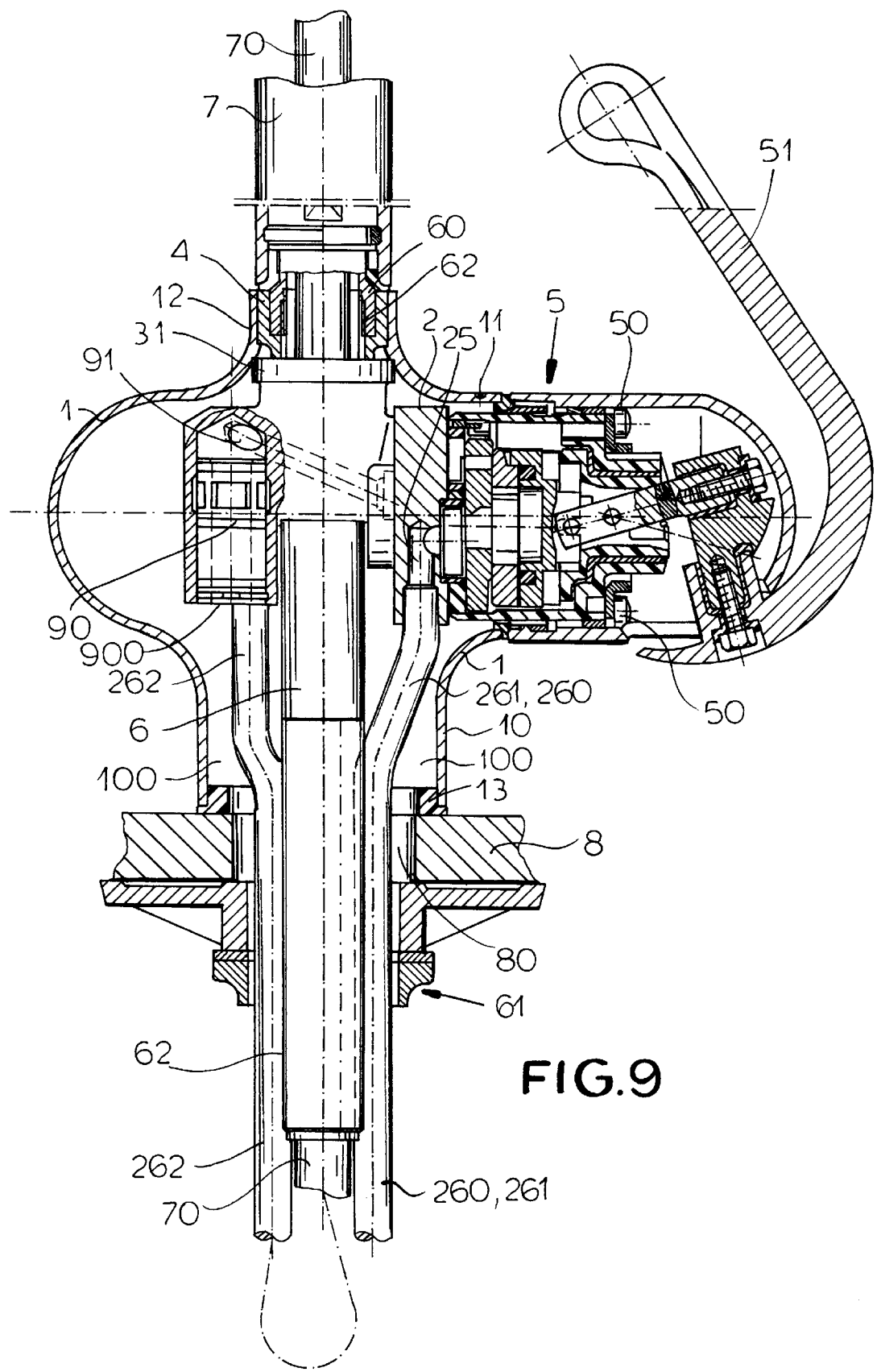
Figure 11:
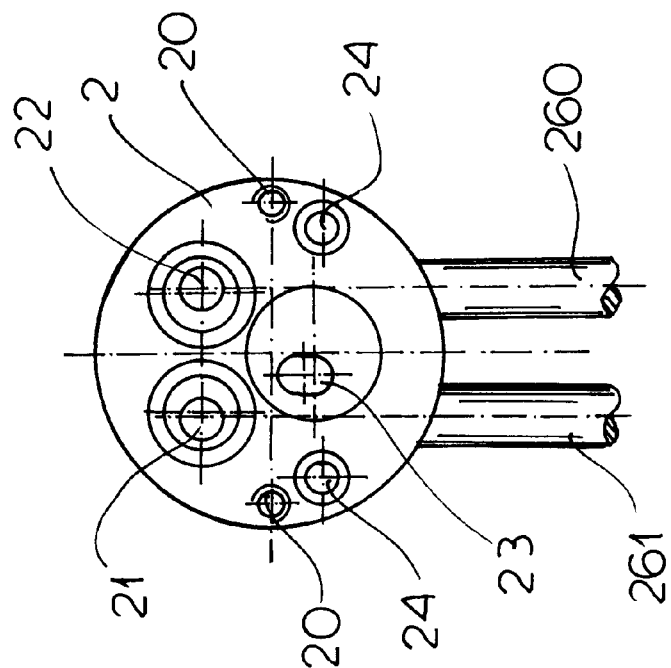
FIG. 11 is a view taken in the insert taken in the direction of arrow XI of FIG. 10.
Figure 12:
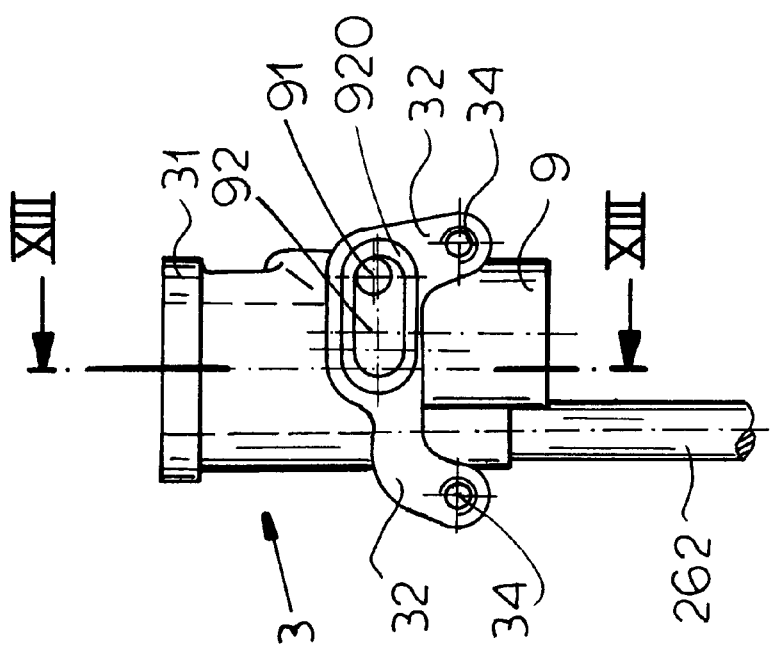
FIG. 12 is a front view of the holder body of FIGS. 9 and 10.
Figure 13:
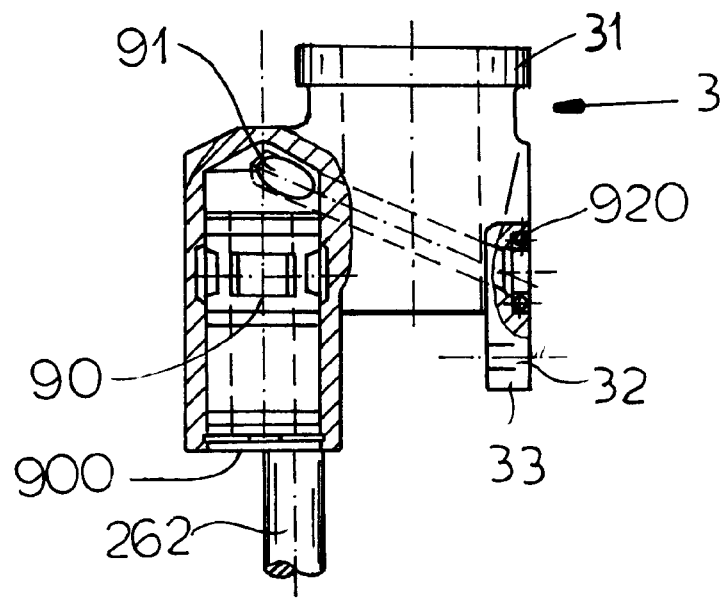
FIG. 13 is a section taken along line XIII'XIII of FIG. 12.
Figure 14:
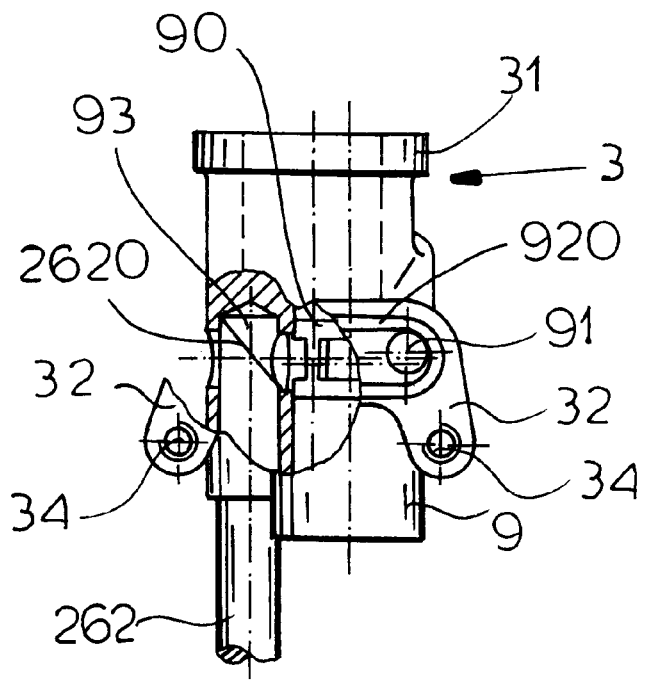
FIG. 14 is a view like FIG. 12 but with parts in section.

The sleeve 4 shown also in FIG. 8 is stepped and has a shoulder 40 bearing axially on a shoulder 121 of the opening 120 and has a small-diameter lower portion formed with an external screwthread 30 that is threaded into the thread 300 of the collar 31 to pull this collar 31 up into engagement with the housing 1 at 122. Diametrally opposite slots 41 formed in the upper end of the sleeve 4 allow a tool to be fitted to it so it can be torqued tightly into place, solidly fixing the holder 2 and insert 3 mounted on it in the housing 1.

A mounting rod or tube 6 extending along the axis A has an upper end formed with a screwthread 62 engaging in a nut 60 forming part of the spout 7 and bearing downward on the sleeve 4.

The hose 70 passes back up through the housing 1 through this tube 6. The tube 6 extends downward through a hole 80 in a counter or deck 8 and at its lower end has another screwthread 62 engaging a nut assembly 61 bearing upward on a lower face of the counter 8. This pulls the collar 10 tightly down onto a seal ring 13 to bear on an upper surface of the counter 8 to solidly mount the housing 1 and its parts. (It being understood that the reference to the vertical herein is solely for ease of description and that the valve would work inverted or on a slant equally well.)

The system of FIGS. 9 through 14 is similar, but her the holder 3 is formed with a vent housing 9. To this end the holder 3 is formed with an opening 92 provided with an O-ring 920, into which the port 23 opens, and which leads via an internal passage 91 to a vent or backflow preventer 90 which has a downwardly open air intake 900 and which is held in the housing 9 of the holder 3. The output line 262 connected to the hose 70 has a beveled end 2620 fitted in a bore 93 formed in the insert 3 and opening via a passage 930 into the passage 91.

Thus if, for instance, a pullout head of the spout 7 is left submerged in a body of dirty water, it will drain. If then there is a pressure reversal in either of the inlet lines 260 or 261, air will be drawn in, not the dirty water in which the spout head is submerged.

We claim:

1. A valve assembly comprising:
   a one-piece housing having lower, upper, and side sockets respectively defining lower, upper, and side openings, the upper opening being formed with an upwardly directed shoulder;
   a stepped mounting sleeve having a downwardly directed shoulder bearing inwardly on the upper-opening shoulder, an upwardly directed shoulder, and a threaded lower end;
   a holder threaded inside the housing onto the sleeve lower end;
   an insert mounted on the holder, having a front face directed outward at the side opening and adapted to carry a valve cartridge, and provided with connections for fluid supply lines;
   a mounting rod extending through the insert and sleeve and having an upper end at the upper socket and a lower portion extending out of the housing through the lower opening;
   a nut threaded on the upper rod end and bearing downward on the upwardly directed shoulder of the mounting sleeve; and
   mounting structure engaged with the rod lower portion outside the housing and adapted to secure the housing down against a mounting surface.

2. The valve assembly defined in claim 1 wherein the holder has a collar through which the rod passes and which bears upward on the housing.

3. The valve assembly defined in claim 2 wherein the holder has a front face on which the insert is mounted.

4. The valve assembly defined in claim 3 wherein the holder has a pair of arms forming the holder front face, the assembly further comprising
   screws engaged through the insert, threaded into the holder arms, and pressing the insert against the holder front face.

5. The valve assembly defined in claim 3 wherein the holder is unitarily formed with a vent housing, the assembly further comprising
   a backflow preventing vent held in the vent housing.

6. The valve assembly defined in claim 1 wherein the insert is formed with hot-, cold-, and mixed-water ports opening at the front face, the assembly further comprising
   respective conduits forming the fluid-supply lines connected to the insert and communicating with the ports.

7. The valve assembly defined in claim 6 wherein the insert is formed with respective holes communicating with the ports and receiving the respective conduits.

8. The valve assembly defined in claim 7 wherein the holder is unitarily formed with a vent housing and with a passage connecting the mixed-water port with the vent housing, the assembly further comprising
   a backflow preventing vent held in the vent housing.

9. The valve assembly defined in claim 8 wherein the insert is provided around the passage connecting the mixed-water port with the vent housing with an O-ring.

10. The valve assembly defined in claim 1 wherein the insert and holder are made of metal.

11. The valve assembly defined in claim 1, further comprising
a seal ring around the lower socket.

* * * * *